United States Patent
Dubey

(10) Patent No.: US 9,631,671 B2
(45) Date of Patent: Apr. 25, 2017

(54) ROLLER BEARING ASSEMBLY FOR A PINION IN A MOTOR VEHICLE DRIVE TRAIN

(71) Applicant: Schaeffler Technologies GmbH & Co. KG, Herzogenaurach (DE)

(72) Inventor: Rohan Dubey, Sterling Heights, MI (US)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 247 days.

(21) Appl. No.: 14/538,255

(22) Filed: Nov. 11, 2014

(65) Prior Publication Data

US 2015/0133261 A1    May 14, 2015

Related U.S. Application Data

(60) Provisional application No. 61/904,198, filed on Nov. 14, 2013.

(51) Int. Cl.

| | | |
|---|---|---|
| *F16C 33/66* | (2006.01) | |
| *F16C 19/38* | (2006.01) | |
| *F16C 33/58* | (2006.01) | |
| F16C 33/78 | (2006.01) | |
| F16H 57/08 | (2006.01) | |

(52) U.S. Cl.
CPC ........ *F16C 33/6681* (2013.01); *F16C 19/386* (2013.01); *F16C 33/586* (2013.01); *F16C 33/7886* (2013.01); *F16C 2361/61* (2013.01); *F16H 57/08* (2013.01); *F16H 2057/085* (2013.01)

(58) Field of Classification Search
CPC .. F16C 19/386; F16C 2361/61; F16C 33/586; F16C 33/6681; F16C 33/7886
See application file for complete search history.

(56) References Cited

U.S. PATENT DOCUMENTS

| | | | |
|---|---|---|---|
| 606,635 | A | 6/1898 | Timken et al. |
| 2,019,464 | A | 10/1935 | Riblet |
| 2,037,206 | A * | 4/1936 | Boden ..................... B60B 35/18 384/564 |
| 2,219,025 | A | 10/1940 | Vanderberg |
| 2,240,118 | A * | 4/1941 | Matthews ............. F16C 19/386 184/11.1 |
| 5,114,248 | A | 5/1992 | Harsdorff |

(Continued)

FOREIGN PATENT DOCUMENTS

| | | | | |
|---|---|---|---|---|
| DE | | 72 28 192 U | 10/1972 | |
| DE | WO 2008077676 A1 * | | 7/2008 | ............. F16C 19/38 |

(Continued)

*Primary Examiner* — Jacob S Scott
(74) *Attorney, Agent, or Firm* — Davidson, Davidson & Kappel, LLC

(57) ABSTRACT

A roller bearing assembly for a motor vehicle drive train is provided. The roller bearing assembly includes a bearing including an inner ring, an outer ring and roller elements rotatably supporting the inner ring with respect to the outer ring. The roller elements include a first roller element and a second roller element. The inner ring includes a first section for supporting the first roller element on the head of the pinion and a second section for supporting the second roller element on the tail of the pinion. The first section is thinner than the second section.

20 Claims, 2 Drawing Sheets

(56) References Cited

U.S. PATENT DOCUMENTS

| | | |
|---|---|---|
| 7,350,977 B2 | 4/2008 | Fukuda et al. |
| 2014/0270616 A1 | 9/2014 | Umemoto et al. |
| 2015/0010261 A1* | 1/2015 | Katsaros ............. B60B 27/0094 384/565 |

FOREIGN PATENT DOCUMENTS

| | | |
|---|---|---|
| EP | 2 554 802 A2 | 2/2013 |
| JP | 2001-336603 A | 12/2001 |
| WO | WO 2005/111443 A1 | 11/2005 |
| WO | WO 2008/077676 A1 | 7/2008 |
| WO | WO 2013/021887 A1 | 2/2013 |

* cited by examiner

ROLLER BEARING ASSEMBLY FOR A PINION IN A MOTOR VEHICLE DRIVE TRAIN

This claims the benefit to U.S. Provisional Patent Application No. 61/904,198, filed on Nov. 14, 2013, which is hereby incorporated by reference herein.

The present disclosure relates generally to roller bearing assemblies and more particularly to roller bearing assemblies for motor vehicle drive trains.

BACKGROUND

U.S. Pat. Nos. 7,350,977, 606,635, EP 2 554 802 A2 and WO 2005/111443 are examples of references that disclose roller bearings assemblies.

SUMMARY OF THE INVENTION

A roller bearing assembly for a motor vehicle drive train is provided. The roller bearing assembly includes a bearing including an inner ring, an outer ring and roller elements rotatably supporting the inner ring with respect to the outer ring. The roller elements include a first roller element and a second roller element. The inner ring includes a first section for supporting the first roller element on the head of the pinion and a second section for supporting the second roller element on the tail of the pinion. The first section is thinner than the second section.

A motor vehicle drive train including the pinion and the roller bearing assembly are also provided.

BRIEF DESCRIPTION OF THE DRAWINGS

The present invention is described below by reference to the following drawings, in which.

DETAILED DESCRIPTION

The present disclosure provides a compact roller bearing assembly for a pinion of motor vehicle drive train, which may have a higher life and lower contact pressure while reducing the overall weight of assembly and making assembly procedure easier. The roller bearing assembly may have a reduced bearing weight by reducing material used in the bearing races. In differentials, such as at a head of a pinion, the pinion itself may be used as a partial raceway support.

Figure 1:
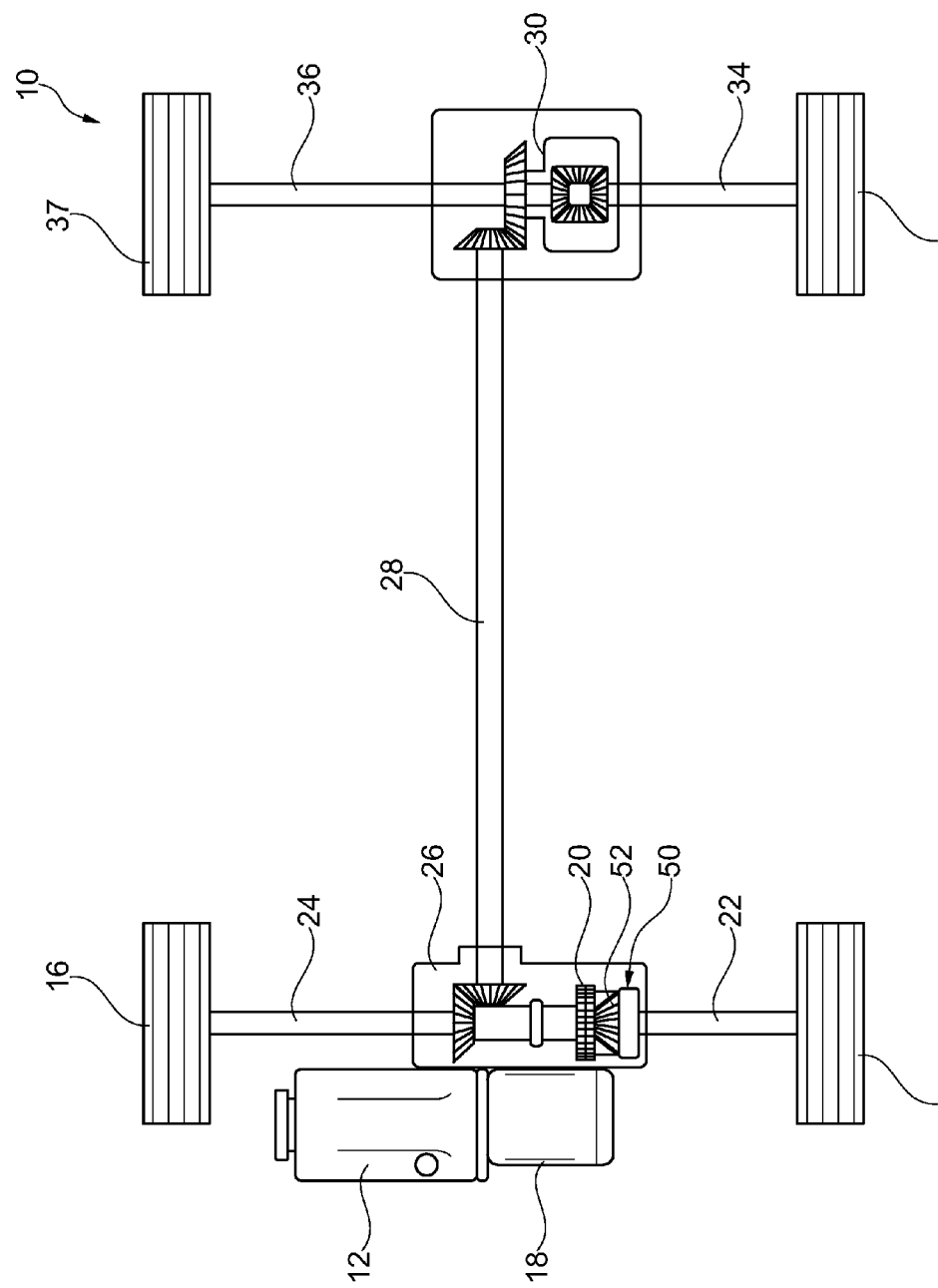
FIG. 1 shows a motor vehicle drive train including a roller bearing assembly in accordance with an embodiment of the present invention.

FIG. 1 shows an AWD motor vehicle drive train 10 in a roller bearing assembly 50 according to an embodiment of the present invention. Drive train 10 includes an engine 12 driving a pair of front wheels 14, 16 via a transmission 18. A front differential 20 is provided between transmission 18 and respective axles 22, 24 of front wheels 14, 16 to allow for speed differences between front wheels 14, 16. A power takeoff unit (PTU) 26 is connected to front differential 20 for transferring power via a rear wheel drive shaft 28 to a pair of rear wheels 35, 37 via respective axles 34, 36. Rear wheel drive shaft 28 is connected to a rear differential 30 from which rear axles 34, 36 extend. PTU 26 further includes roller bearing assembly 50 for a pinion 52 of front differential 20.

Figure 2:
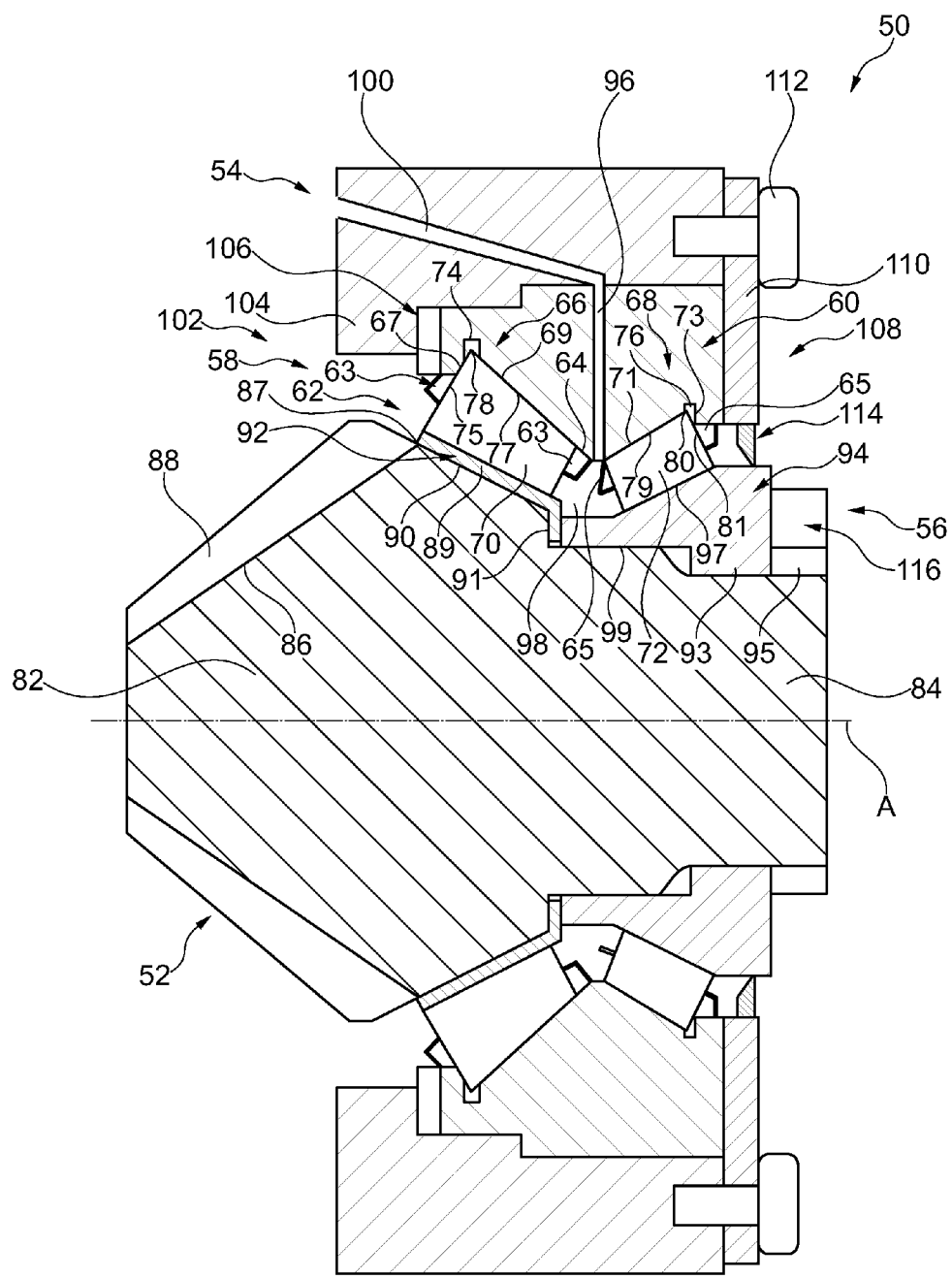
FIG. 2 schematically shows a cross-sectional side view of the roller bearing assembly in accordance with an embodiment of the present invention.

FIG. 2 shows roller bearing assembly 50 in accordance with a preferred embodiment of the present invention. Roller bearing assembly 50 supports pinion 52 for rotation about an axis A. Roller bearing assembly 50 includes a housing 54 and a bearing 58, which includes an inner ring 56, an outer ring 60 and roller elements 62. Roller elements 62 rotatably support inner ring 56 with respect to outer ring 60. Outer ring 60, on the inner radial side thereof, has an inner rib 64, a first raceway 66 and a second raceway 68 Inner rib 64 is formed between raceways 66, 68 at the inner surface of outer ring 60. Roller elements 62 include a first tapered roller element 70 received in and riding along first raceway 66 and a second taper roller element 72 received in and riding along second raceway 68. Roller element 70 is provided with a cage 63 formed by two sections, one at each axial edge thereof, and roller element 72 is provided with a cage 65 formed by two sections, one at each axial edge thereof. Cages 63, 65 are each formed by two rings extending around axis A that align roller elements 70, 72 in raceways 66, 68, respectively.

Raceway 66 is formed by two first inclined inner surfaces 67, 69, which are inclined with respect to axis A, extending inwardly towards outer ring 60 to meet at an inverting tip 74 and raceway 68 is formed by two second inclined inner surfaces 71, 73, which are inclined with respect to axis A, extending inwardly towards outer ring 60 to meet at an inverting tip 76. In this embodiment, the first inclined inner surfaces 67, 69 of raceway 66 are angled with respect to each other in the cross-sectional view of FIG. 2 at acute angles and the second inclined inner surfaces 71, 73 of raceway 68 are angled with respect to each other in the cross-sectional view of FIG. 2 at acute angles. First inclined inner surface 69 and second inclined inner surface 71 meet at inner rib 64. Roller bearing 70 includes two inclined outer surfaces 75, 77, which are inclined with respect to axis A, extending outwardly away from roller bearing 70 to meet at a protruding tip 78 and roller bearing 72 includes two inclined outer surfaces 79, 81, which are inclined with respect to axis A, extending outwardly away from roller bearing 72 to meet at a protruding tip 80. Such that roller bearings 70, 72 fit snugly into raceways 66, 68, respectively, the angles formed by inclined outer surfaces 75, 77 of roller bearing 70 are substantially the same as the angles formed by the inclined inner surfaces 67, 69, respectively, of raceway 66 and the angles formed by inclined outer surfaces 79, 81 of roller bearing 72 are substantially the same as the angles formed by the inclined inner surfaces 71, 73, respectively, of raceway 68.

Pinion 52 includes a head 82 and a tail 84. First roller bearing 70 forms a bearing for head 82 and second roller bearing 72 forms a bearing for tail 84. Head 82 includes a first frustoconical portion 86 having drivable teeth 88 formed on the outer surface thereof and a second frustoconical portion 90 contacting and supporting inner ring 56, specifically a first section 92 of inner ring 56. First frustoconical portion 86 and second frustoconical portion 90 are positioned opposite to each other and meet to define an outer radial peak 87. In this preferred embodiment, first section 92 is a ring formed by a drawn or machined sleeve with a profile formed by a first portion 89, which is frustoconical, on an outer surface thereof that is inclined with respect to axis A so as to support an inner surface of roller bearing 70 that is inclined with respect to axis A. As shown in FIG. 2, first section 92 is shaped for being received snugly on second frustoconical portion 90.

First section 92 also includes a second portion 91 in the form of a radial protrusion extending substantially perpendicular to axis A for contacting a back surface of head 82. First portion 89 and second portion 91 are angled with respect to each other as viewed radially in cross-section, as shown in FIG. 2, with an inner surface of first portion 89 being inclined with respect to axis A as viewed radially in cross-section, as shown in FIG. 2. Second frustoconical portion 90 of head 82 is positioned between first frustoconical portion 86 and tail 84. Tail 84, on a portion thereof adjacent to second frustoconical portion 90, also contacts and supports inner ring 56, specifically a second section 94 of inner ring 56. Second section 94 is formed as an accurately machined extended frustoconical ring that rests on an outer surface of tail 84 and includes an inclined outer surface 97 thereof that is inclined with respect to axis A so as to support an inner surface of roller bearing 72 that is inclined with respect to axis A. First section 92 is thinner than second section 94 to allow first section 92 to be received on head 84. First section 92 also has a uniform thickness, while second section 94 has a varying thickness. Second section 94 may include a splined inner portion 93 for meshing with a splined outer portion 95 of tail 84 and a front surface at the end thereof for contacting radial protrusion 91 of first section 92. Second section 94 also includes an inner surface 99 for contacting tail 84 and extending parallel to center axis A. Second section 94 provides the flexibility for selective assembly for setting the correct dimensional preload on the bearing raceways.

In this embodiment, outer ring 60 is formed as a single piece that includes channels 96 formed therein that are circumferentially spaced at regular intervals for delivering lubricating fluid to an annular chamber 98, which extends circumferentially about axis A, formed between roller bearings 70, 72. Channel 96 extends from the outer surface of outer ring 60 to the inner surface of outer ring 60 at inner rib 64 to deliver lubricating fluid to both of roller bearings 70, 72. In this embodiment, rib 64 is formed at the tip of a v-shaped portion of outer ring 60, when viewed in cross-section as shown in FIG. 2, and rib 64 extends between roller bearings 70, 72. The lubricating fluid is delivered to channel 96 by a channel 100 formed in housing 54.

On a head side 102 of roller bearing assembly 50, housing 54 includes a radial protrusion 104 extending radially inward past the outer surface of outer ring 60. A shim or spacer 106 may be provided axially between radial protrusion 104 of housing 54 and a first axial end of outer ring 60 to adjust the axial positioning depth of pinion 82. On a tail side 108 of roller bearing assembly 50, an end cover 110 is fixed to housing 54 by a fastener 112. End cover 110 contacts a second axial end of outer ring 60 and holds outer ring 110 axially in place between protrusion 104 of housing 54 (or shim 106, if provided) and end cover 110. On an inner radial surface of thereof, end cover 110 holds a seal 114 for sealingly contacting the outer surface of second section 94 of inner ring 56. Roller bearing assembly 50 also includes a lock nut 116 on tail side 108 for locking first and second sections 92, 94 of inner ring 56 into place on pinion 82.

Although it is indicated above that roller bearing assembly 50 may be used for pinion 52 of front differential 20, roller bearing assembly 50 may also be used for other motor vehicle drive train pinions.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A roller bearing assembly for a pinion of a motor vehicle drive train, the pinion including a head and a tail, the roller bearing assembly comprising:
   a bearing including an inner ring, an outer ring and roller elements rotatably supporting the inner ring with respect to the outer ring, the roller elements including a first roller element and a second roller element, the inner ring including a first section for supporting the first roller element on the head of the pinion and a second section for supporting the second roller element on the tail of the pinion, the first section being thinner than the second section, the first section including an inner surface that is inclined with respect to a center axis of the pinion as viewed radially in cross-section.

2. The roller bearing assembly as recited in claim 1 wherein the first section of the inner ring has a uniform thickness and the second section of the inner ring has a varying thickness.

3. The roller bearing assembly as recited in claim 2 wherein the second section of the inner ring includes an outer inclined surface for supporting the second roller element and an inner surface for contacting the tail of the pinion extending parallel to a center axis of the pinion.

4. The roller bearing assembly as recited in claim 1 wherein the head of the pinion includes a frustoconical portion, the first section of the inner ring being shaped for being received on the frustoconical portion.

5. The roller bearing assembly as recited in claim 1 wherein the first section of the inner ring includes a first portion and a second portion angled with respect to each other as viewed radially in cross-section, the first portion including the inner surface that is inclined with respect to a center axis of the pinion as viewed radially in cross-section.

6. The roller bearing assembly as recited in claim 5 wherein an inner surface of the second portion is substantially perpendicular with respect to the center axis of the pinion as viewed radially in cross-section.

7. The roller bearing assembly as recited in claim 6 wherein an end of the second section of the inner ring contacts the second portion of the first section of the inner ring.

8. The bearing assembly as recited in claim 1 wherein the first and second roller elements are tapered roller elements.

9. The roller bearing assembly as recited in claim 1 wherein the outer ring includes a channel formed therein for supplying lubricating fluid to both of the first roller element and the second roller element.

10. The roller bearing assembly as recited in claim 1 wherein each of the first roller element and the second roller element include an inclined inner surface.

11. The roller bearing assembly as recited in claim 10 wherein the first section of the inner ring contacts the inclined inner surface of the first roller element and the second section of the inner ring contacts the inclined inner surface of the second roller element.

12. The roller bearing assembly as recited in claim 1 further comprising a housing contacting the outer ring.

13. The roller bearing assembly as recited in claim 12 further comprising an end cover fixed to the housing at a tail side of the roller bearing assembly, the end cover axially securing the outer ring.

14. The roller bearing assembly as recited in claim 13 further comprising a seal held by the end cover, the seal sealingly contacting an outer surface of the inner ring.

15. A motor vehicle drive train comprising:
the pinion as recited in claim 1; and
the roller bearing assembly as recited in claim 1 rotatably supporting the pinion.

16. The motor vehicle drive train as recited in claim 15 wherein the pinion is included in a differential.

17. The motor vehicle drive train as recited in claim 15 wherein the head of the pinion includes a first frustoconical portion having drivable teeth and a second frustoconical portion, the first section of the inner ring resting on the second frustoconical portion.

18. The motor vehicle drive train as recited in claim 17 wherein the first section of the inner ring includes a frustoconical portion contacting the second frustoconical portion of the head and supporting the first rolling element.

19. A roller bearing assembly for a pinion of a motor vehicle drive train, the pinion including a head and a tail, the roller bearing assembly comprising:
a bearing including an inner ring, an outer ring and roller elements rotatably supporting the inner ring with respect to the outer ring, the roller elements including a first roller element and a second roller element, the inner ring including a first section for supporting the first roller element on the head of the pinion and a second section for supporting the second roller element on the tail of the pinion, the first section being thinner than the second section,
wherein the first section of the inner ring has a uniform thickness and the second section of the inner ring has a varying thickness.

20. A roller bearing assembly for a pinion of a motor vehicle drive train, the pinion including a head and a tail, the roller bearing assembly comprising:
a bearing including an inner ring, an outer ring and roller elements rotatably supporting the inner ring with respect to the outer ring, the roller elements including a first roller element and a second roller element, the inner ring including a first section for supporting the first roller element on the head of the pinion and a second section for supporting the second roller element on the tail of the pinion, the first section being thinner than the second section,
wherein the outer ring includes a channel formed therein for supplying lubricating fluid to both of the first roller element and the second roller element.

* * * * *